June 2, 1925.

W. D. VERSCHOYLE

TARGET FOR TRAP SHOOTING AND THE LIKE

Filed May 17, 1924

1,539,977

Inventor.
William D. Verschoyle
M. H. Lockwood
Attorney.

Patented June 2, 1925.

1,539,977

UNITED STATES PATENT OFFICE.

WILLIAM DENHAM VERSCHOYLE, OF BALLISODARE, IRELAND.

TARGET FOR TRAP SHOOTING AND THE LIKE.

Application filed May 17, 1924. Serial No. 713,839.

*To all whom it may concern:*

Be it known that I, WILLIAM DENHAM VERSCHOYLE, of Tanrago, Ballisodare, in the county of Sligo, Ireland, mining engineer, a subject of the King of Great Britain, have invented certain new and useful Improvements in or Relating to Targets for Trap Shooting and the like, of which the following is a specification.

This invention relates to targets for trap-shooting and the like and has for its object to provide an improved target which will be more difficult to hit than those in use heretofore, thus increasing the interest of such shooting, especially for experts who can break from 90% to 100% of the usual clay pigeons.

According to the present invention the improved target is constituted by a plate comprising two sections united by a neck portion, all of which are curved, out of the flat, transversely of a line which substantially bisects each of said sections and neck portion, whilst a slight twist may be imparted to the sections themselves as in propellor blades.

Figure 1:
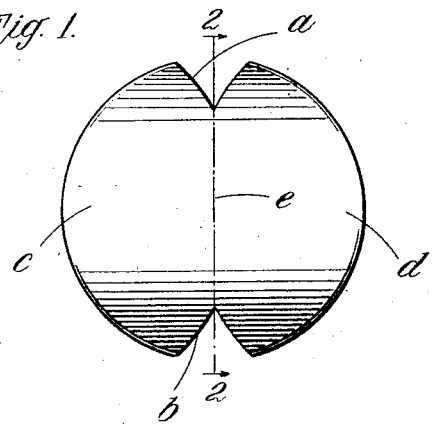
Figure 2:
Figure 3:
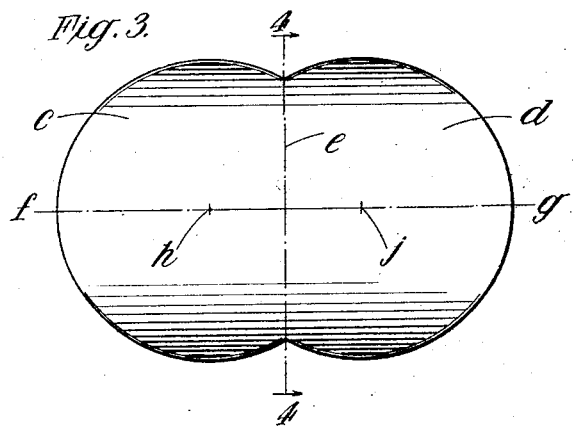
Figure 4:
Figure 5:
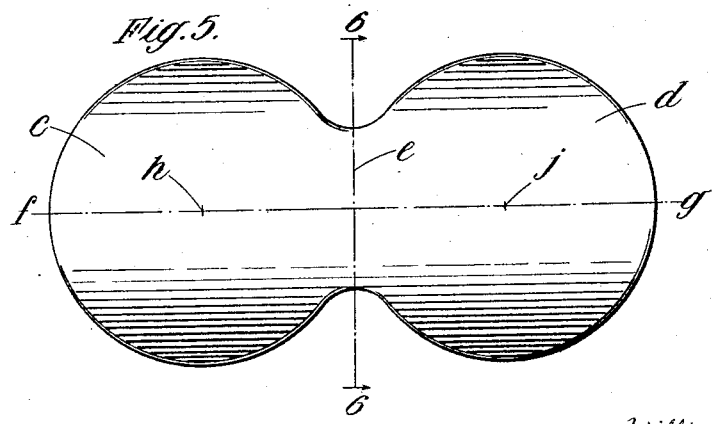

The invention is illustrated by the accompanying drawings, wherein Figure 1 is a face view of one form of the improved target; Figure 2 is a section on the line 2—2, Figure 1; Figure 3 is a face view of a modified form of target; Figure 4 is a section on the line 4—4, Figure 3; Figure 5 is a face view of a further modification of the invention, and Figure 6 is a section on the line 6—6, Figure 5.

In accordance with the form of the invention shown in Figures 1 and 2, the target is a circular disc with two diametrically opposite notches $a$ $b$ which divide the disc into two sections $c$ $d$ united by a neck portion $e$. As shown in Figure 2, the disc is cambered by being curved slightly in a direction from notch to notch, the camber being variable according to requirements. If such a disc be gripped at either end of the crown of the camber and projected horizontally from a trap so as to cause it to spin in a horizontal plane about its centre of gravity, its flight will be fairly regular, much like that of an ordinary clay pigeon, but faster, and it has been found that good results may be obtained with a disc of about 4″ diameter and $\frac{3}{16}″$ thickness.

As shown in Figures 3 and 4, the profile of the target may be constituted by the major arcs of two intersecting circles, and the line $f$ $g$ transversely of which the target is curved is that on which lie the centres $h$ and $j$ of the circles. If such a target be made with its two sections $c$, $d$ symmetrical, the centres $h$ and $j$ of the circles being spaced apart a distance approximately equal to the radius of said circles, and said target be projected horizontally as above, its flight will be fairly regular, much like that of an ordinary clay pigeon but longer and faster. If however, the two sections $c$ and $d$ be made asymmetrical they will react unequally on the air, causing eccentricity of the spinning and a resultant erratic line of flight.

Figure 6:

In the form of the invention shown in Figures 5 and 6 the profile of the target is constituted by the major arcs of two mutually tangential circles, side by side, the curvilinear angles between which are partly filled in to constitute the neck portion $e$, whilst the line $f$ $g$ transversely of which the target is curved is that on which lie the centres $h$, $j$ of the circles.

If such a target be made with its two sections $c$, $d$ symmetrical and if it be projected horizontally as above, the reaction on the air, caused by the spinning, tends to produce a constant lifting effect, and, in practice, it is found that the target rises along a curved path and returns substantially to the starting point, like a boomerang. Here again asymmetry of the two sections $c$, $d$ of the target will cause eccentricity of the spinning and a resultant erratic line of flight.

It has been found that the two sections $c$, $d$ of the target may be shaped otherwise than above mentioned, e. g., rectangular, rhombic, elliptical and so on, whilst asymmetry of the two sections may be caused by differences of thickness, and therefore of weight, differences of dimensions, shape and/or camber.

If the improved target be projected in a vertical plane, especially the modified form last described, it will after flying a short distance, veer round towards a horizontal plane and continue its flight as above set forth. In some cases, each of the sections $c$, $d$ of a target may be twisted slightly, e. g., about the line $f$, $g$ like the blades of an aeroplane or similar propellor.

It is desirable that the improved target should be projected from a trap with gripping jaws lined with a material which will not damage the target prematurely and the gripping effect of which is adjustable as, the best effects may be obtained by suitable correlation of the initial velocity, size, weight and camber of the target.

The improved target may be made of frangible material, as is usual with clay pigeons, in which case it may be produced more cheaply, or it may be made from light sheet or cast metal, in which case it may be used as an attractive toy.

I claim:—

1. An improved target for trap shooting and the like constituted by a plate comprising two sections, and a neck portion uniting said sections, said sections and neck portion being curved, out of the flat, transversely of a line which substantially bisects each of said sections and neck portion.

2. An improved target for trap shooting and the like, as claimed in claim 1, wherein the sections themselves are twisted slightly about said line.

3. An improved target for trap shooting and the like, as claimed in claim 1, formed from a circular disc with two diametrically opposite notches, said disc being cambered slightly in a direction from notch to notch.

4. An improved target for trap shooting and the like, as claimed in claim 1, having a profile constituted by the major arcs of two circles, said target being cambered transversely of a line on which lie the centres of said circles.

5. A target for trap shooting and the like, as claimed in claim 1, the sections of which are asymmetrical substantially as set forth.

WILLIAM DENHAM VERSCHOYLE.